United States Patent
Nagy

(10) Patent No.: US 9,684,064 B2
(45) Date of Patent: Jun. 20, 2017

(54) APPARATUS AND METHOD FOR DETERMINING A VEHICLE FEATURE

(71) Applicant: Kapsch TrafficCom AG, Vienna (AT)

(72) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 523 days.

(21) Appl. No.: 14/266,331

(22) Filed: Apr. 30, 2014

(65) Prior Publication Data
US 2014/0333469 A1    Nov. 13, 2014

(30) Foreign Application Priority Data

May 13, 2013   (EP) ..................................... 13167406

(51) Int. Cl.
*G01S 7/41*    (2006.01)
*G01S 13/92*   (2006.01)
(Continued)

(52) U.S. Cl.
CPC ............... *G01S 7/41* (2013.01); *G01S 13/06* (2013.01); *G01S 13/91* (2013.01); *G01S 13/92* (2013.01); *G08G 1/01* (2013.01); *G01S 13/50* (2013.01); *G08G 1/017* (2013.01); *G08G 1/0116* (2013.01); *G08G 1/052* (2013.01)

(58) Field of Classification Search
CPC .......... G01S 13/91; G01S 13/92; G01S 7/292; G01S 13/50; G01S 7/35; G01S 7/41–7/412; G08G 1/00; G08G 1/01–1/0116; G08G 1/01251–1/0145;
(Continued)

(56) References Cited

U.S. PATENT DOCUMENTS 4,717,915 A  *  1/1988  Goede .................... G08G 1/054
                                                  342/106
4,743,908 A  *  5/1988  Brassfield ............. G01S 13/583
                                                  342/113
(Continued)

FOREIGN PATENT DOCUMENTS

EP        0636900 A2    2/1995

OTHER PUBLICATIONS

Extended European Search Report received for EP Patent No. 13167406.1, mailed on Jul. 29, 2013, 8 pages.

*Primary Examiner* — Peter Bythrow
(74) *Attorney, Agent, or Firm* — Fiala & Weaver P.L.L.C.

(57) ABSTRACT

Techniques are disclosed for determining characteristic feature(s) of a vehicle travelling on a roadway, comprising: a detector, which is directed towards the roadway and is configured to measure the movement vector of the vehicle at a current location and time, a tracking unit, connected to the detector, for calculating a target location of the vehicle at a target time on the basis of current location and time and movement vector, a first radar sensor, connected to the detector, for transmitting a radar beam directed towards the current location, receiving a reflected radar beam, and determining a frequency spectrum thereof, a second radar sensor, connected to the tracking unit, for transmitting a radar beam directed towards the target location at the target time, receiving a reflected radar beam and determining a frequency spectrum thereof, and an evaluation unit for generating characteristic feature(s) of the vehicle from the determined frequency spectra.

16 Claims, 4 Drawing Sheets

(51) Int. Cl.
*G08G 1/00* (2006.01)
*G01S 13/91* (2006.01)
*G01S 13/06* (2006.01)
*G08G 1/052* (2006.01)
*G08G 1/01* (2006.01)
*G01S 13/50* (2006.01)
*G08G 1/017* (2006.01)

(58) Field of Classification Search
CPC ...... G08G 1/015; G08G 1/017; G08G 1/0175; G08G 1/052; G08G 1/054
USPC .............................. 342/70–72; 701/117–119
See application file for complete search history.

(56) References Cited

U.S. PATENT DOCUMENTS

| | | | | |
|---|---|---|---|---|
| 4,866,438 A * | 9/1989 | Knisch | ............... | G08G 1/054 340/936 |
| 5,066,950 A * | 11/1991 | Schweitzer | ............ | G08G 1/054 340/936 |
| 5,266,954 A * | 11/1993 | Orlowski | ............... | G01S 13/62 342/114 |
| 5,402,346 A * | 3/1995 | Lion | ............... | G01S 13/64 340/933 |
| 5,510,794 A * | 4/1996 | Asbury | ............... | G01S 13/24 342/42 |
| 5,694,134 A * | 12/1997 | Barnes | ............... | H01G 7/06 333/161 |
| 5,717,390 A * | 2/1998 | Hasselbring | ........... | G01S 7/411 235/379 |
| 5,793,491 A * | 8/1998 | Wangler | ............... | G01S 7/4802 356/398 |
| 5,969,641 A * | 10/1999 | Nakamura | ............. | G08G 1/017 235/384 |
| 6,160,494 A * | 12/2000 | Sodi | ............... | G08G 1/052 340/928 |
| 6,177,885 B1 * | 1/2001 | Weil | ............... | G08G 1/0104 340/934 |
| 6,195,019 B1 * | 2/2001 | Nagura | ............... | G07B 15/063 235/384 |
| 6,266,627 B1 * | 7/2001 | Gatsonides | ........... | G01S 13/582 340/936 |
| 6,272,443 B1 * | 8/2001 | Motzko | ............... | B60W 40/068 702/142 |
| 6,614,536 B1 * | 9/2003 | Doemens | ............... | G01S 7/4802 356/28 |
| 6,657,554 B1 * | 12/2003 | Terashima | ........... | G07B 15/063 340/928 |
| 6,781,523 B2 * | 8/2004 | Matsui | ............... | G07B 15/063 340/910 |
| 7,038,614 B1 * | 5/2006 | Aker | ............... | G01S 13/583 342/70 |
| 7,190,306 B2 * | 3/2007 | Janssen | ............... | G08G 1/01 342/104 |
| 7,405,676 B2 * | 7/2008 | Janssen | ............... | G08G 1/01 250/224 |
| 7,426,450 B2 * | 9/2008 | Arnold | ............... | G01S 13/583 702/142 |
| 7,501,976 B2 * | 3/2009 | Manor | ............... | G01S 13/4445 340/933 |
| 8,035,546 B2 * | 10/2011 | Nalezinski | ............. | G01S 7/021 342/104 |
| 8,115,670 B2 * | 2/2012 | Klein | ............... | G01S 13/584 340/936 |
| 8,299,957 B2 * | 10/2012 | Tseng | ............... | G01S 7/415 342/104 |
| 8,593,336 B2 * | 11/2013 | Kajiki | ............... | G01S 7/4017 342/165 |
| 8,665,113 B2 * | 3/2014 | Arnold | ............... | G01S 13/48 340/907 |
| 2002/0140924 A1 * | 10/2002 | Wangler | ............... | G01S 7/4802 356/28 |
| 2004/0227661 A1 * | 11/2004 | Godsy | ............... | G01S 13/325 342/70 |
| 2005/0046597 A1 * | 3/2005 | Hutchison | ............... | G08G 1/07 340/917 |
| 2006/0066472 A1 * | 3/2006 | Janssen | ............... | G08G 1/01 342/104 |
| 2007/0096943 A1 * | 5/2007 | Arnold | ............... | G01S 13/34 340/907 |
| 2008/0278365 A1 * | 11/2008 | Klein | ............... | G01S 13/584 342/104 |
| 2008/0278366 A1 * | 11/2008 | Behrens | ............... | G01S 7/41 342/109 |
| 2009/0102699 A1 * | 4/2009 | Behrens | ............... | G01S 13/42 342/109 |
| 2011/0291876 A1 * | 12/2011 | Hong | ............... | G01S 13/589 342/113 |
| 2012/0133547 A1 * | 5/2012 | MacDonald | ........... | G01S 13/931 342/70 |
| 2013/0099943 A1 * | 4/2013 | Subramanya | ........ | G01S 7/2926 340/933 |
| 2013/0151135 A1 * | 6/2013 | Aubrey | ............... | G08G 1/00 701/118 |
| 2013/0222177 A1 * | 8/2013 | Kajiki | ............... | G01S 13/66 342/109 |
| 2014/0049419 A1 * | 2/2014 | Lehning | ............... | G08G 1/0116 342/107 |
| 2014/0176360 A1 * | 6/2014 | Lehning | ............... | G01S 13/867 342/66 |

* cited by examiner

APPARATUS AND METHOD FOR DETERMINING A VEHICLE FEATURE

CROSS-REFERENCE TO RELATED APPLICATION(S)

This application claims priority to European Patent Application No. 13 167 406.1, filed on May 13, 2013, the entirety of which is incorporated by reference herein.

BACKGROUND

Technical Field

The present subject matter relates to an apparatus and a method for determining a characteristic feature of a vehicle travelling on a roadway. The present subject matter further relates to a system comprising at least two such apparatuses.

Background Art

The determination of characteristic features of vehicles is important for many tasks in the field of traffic control, traffic monitoring and traffic billing. Individual vehicles can thus be detected and, for example, counted or automatically tracked, assigned on the basis of their features to certain vehicles classes, for example, passenger vehicles or lorries, and class-dependent tariff models or vehicle-class-dependent driving restrictions in road toll systems or parking fee systems can be created, checked and implemented on this basis.

Predominantly optical systems, such as light barriers, laser scanners or video cameras, are currently used to determine characteristic features. For example, a laser scanner operating on the basis of the light-section method is known, for example, from EP 2 306 429 B1. Such systems are reliant on good visibility and are therefore highly dependent on the weather; they often fail in rain, snow or spray. The optics of light barriers, laser scanners (e.g. US 2002/0140924 A1) and video cameras also require frequent cleaning in order to remain ready for use.

In sub-areas, such as traffic flow monitor systems, radar systems are also currently used, which, from a raised point, for example an antenna mast next to a motorway, detect the movements of the traffic by means of Doppler radar and can track said movements in a radar image. The measurement accuracy of such radar systems is limited however, and the evaluation of the speeds requires a high computing effort in order to create the traffic flow image. In document EP 0 636 900, radio waves are used for velocity and distance measurements to therefrom create a distance measurement point silhouette of the vehicle.

BRIEF SUMMARY

It is an object of the disclosed subject matter to create an apparatus and a method for determining a characteristic feature of a vehicle, said apparatus and method being less susceptible to failure and requiring less maintenance than the known optical systems and being simpler, more cost effective and more accurate than the known radar systems.

This object is achieved in a first aspect with an apparatus for determining a characteristic feature of a vehicle travelling on a roadway, comprising:

a detector, which is directed towards the roadway and which is configured to measure the movement vector of the vehicle at a current location at a current time, a tracking unit connected to the detector for calculating a target location of the vehicle at a target time on the basis of the current location, current time and movement vector, a first radar sensor, connected to the detector, for transmitting a first radar beam directed towards the current location, receiving a first reflected radar beam and determining a first frequency spectrum thereof, a second radar sensor, connected to the tracking unit, for transmitting a second radar beam directed towards the target location at the target time, receiving a second reflected radar beam, and determining a second frequency spectrum thereof, and an evaluation unit for generating the characteristic feature of the vehicle from the determined frequency spectra, wherein the determined frequency spectra constitute the characteristic feature of the vehicle.

The present subject matter is based on the finding of the inventors that the determined frequency spectra reproduce characteristic vehicle features. The vehicle and specific surface structure thereof, such as transitions from body surfaces to glass surfaces, rear-view mirrors, antennas, windscreen wipers, exhaust parts or attached cooling apparatuses etc., each reflect specific spectral components of the transmitted radar beams and thus generate a specific profile of the frequency spectra as a characteristic feature of the vehicle. Changes therein from the first to the second determined frequency spectrum constitute an additional component of the characteristic feature of the vehicle. There is no need for interpretation of each frequency spectrum. This reduces the evaluation effort compared with the known art considerably. In comparison to optical sensors, radar sensors are also less susceptible to the visual impairments occurring in road traffic and are also less susceptible to soiling.

The direction of the radar beam of the second radar sensor may, for example, be controlled. The second radar sensor can thus be easily adapted to different requirements, for example due to its mounting or with respect to the speed (possibly also the selected lane) of the vehicle; successive radar beams can also be transmitted in different directions.

The ability to control the direction of the second radar sensor can be achieved, for example, by at least two sequentially controllable radar antennas with different transmission direction; alternatively or in addition, a mechanically pivotable radar antenna could also be used. The second radar sensor may, for example, have a radar antenna with a controllable direction characteristic in the form of a phase-controlled antenna array. There is thus no need for any mechanical movable parts or for a switchover from one radar antenna to another radar antenna; the susceptibility to faults is further reduced, and the availability of the apparatus is increased.

The tracking unit may, for example, be configured to calculate at least one further target location/time pair, if the second radar sensor is, for this purpose, configured to determine at least one further frequency spectrum in the aforementioned manner, and if the evaluation unit is configured to generate the characteristic feature from all determined frequency spectra. Such further frequency spectra, which are determined with respect to a passing vehicle, make the characteristic feature of the vehicle even clearer, since modifications to the frequency spectra are incorporated in a number of steps.

In an embodiment, the first and second radar sensors are formed by a common radar sensor of which the direction can be controlled, whereby a radar sensor is spared. In an embodiment, the detector may, for example, also be formed by the first radar sensor, which measures the speed of the movement vector in the direction of travel of the roadway, for example, on the basis of a Doppler evaluation of the reflected radar beam. There is thus no need for any further sensors for detection of the current location and current time of the vehicle; in this embodiment, the recognition of a vehicle on the basis of an evaluation of the reflected first radar beam, for example, in the frequency spectrum, is sufficient for detection. If no vehicle is detected, the first radar sensor can thus transmit a first radar beam directed towards the current location, for example, at regular intervals, until a vehicle is detected.

The direction of the movement vector may, for example, be determined by the direction of travel of the roadway, since in this case the movement vector is already determined on the basis of a Doppler evaluation, determining the speed of the vehicle, of a reflected radar beam.

In an embodiment, the apparatus may, for example, further comprise a database for receiving characteristic reference features of reference vehicles of known vehicle class, wherein the evaluation unit is further configured to compare the generated characteristic feature with the reference features and, in the case of a match, to output the vehicle class of the matching reference vehicle. A vehicle can thus be classified on the basis of the frequency spectra of reflected radar beams, which constitute a "fingerprint" of the vehicle so to speak. An assignment of individual peaks in the frequency spectra, for example, to attachment parts or to the entire (optical) appearance of the vehicle, as would be necessary in the case of optical image recognition, can be omitted; reference features can be generated by simply being "taught in", that is to say by recording the frequency spectra of identical or similar vehicles of known class.

In a second aspect, a system which comprises at least two of the aforementioned apparatuses may be created, wherein the apparatuses are mounted at a distance from one another on a gantry spanning the roadway, and wherein at least two of the apparatuses may, for example, be directed towards different lanes of the roadway. A number of traffic lanes can thus be evaluated by one system. With a plurality of apparatuses directed towards a lane, the frequency spectra of the apparatus most clearly affected or an average of the frequency spectra of the apparatuses can be used, whereby the system is less susceptible to faults, for example due to indecisive lane selection of a vehicle.

In a third aspect, a method for determining a characteristic feature of a vehicle driving on a roadway may be created, said method comprising:

transmitting a first radar beam, directed towards a current location, at a current time, receiving a first reflected radar beam, and determining a first frequency spectrum thereof, with simultaneous, prior or subsequent;

measurement of the movement vector of the vehicle at the current location and calculation of a target location of the vehicle at a target time on the basis of the current location, current time and movement vector;

transmitting a second radar beam, directed towards the target location, at the target time, receiving a second reflected radar beam, and determining a second frequency spectrum thereof; and generating the characteristic feature of the vehicle from the determined frequency spectra, wherein the determined frequency spectra constitute the characteristic feature of the vehicle.

With respect to the advantages of the method, reference is made to the statements above concerning the apparatus.

In an embodiment, the frequency spectra form the characteristic feature as a surface over a frequency/time plane. The surface forms a "fingerprint" of the vehicle so to speak and can be easily stored, compared and even optically evaluated, without further interpretation of the spectral components of the frequency spectra.

In an embodiment, at least one further target location/time pair may be calculated, and at least one further frequency spectrum may be determined in the aforementioned manner for this purpose, wherein the characteristic feature is generated from all determined frequency spectra. In order to calculate each further target location/time pair, a further movement spectra is measured in each case. Improved tracking of the vehicle is thus possible even with a change in speed and/or driving direction. If the tracking is to be as simple as possible, the speed of the movement vector in the direction of travel of the roadway may be measured on the basis of a Doppler evaluation of the reflected radar beam.

In an embodiment, the current location/time pair may be determined by detection of the current time of part of the vehicle at a predefined current location, wherein the vehicle part is detected by comparing the frequency spectrum of the first reflected radar beam with a reference frequency spectrum determined with an empty roadway. This constitutes a very simple decision criterion for a vehicle detection.

In accordance with an embodiment, the method is further used to classify a vehicle, wherein the generated characteristic feature is compared with reference features of reference vehicles of known vehicle class, and, in the case of a match, the vehicle class of the matching reference vehicle is output.

BRIEF DESCRIPTION OF THE DRAWINGS/FIGURES

The present subject matter will be explained in greater detail hereinafter on the basis of an exemplary embodiment illustrated in the accompanying drawings. In the figures.

DETAILED DESCRIPTION

Figure 1:
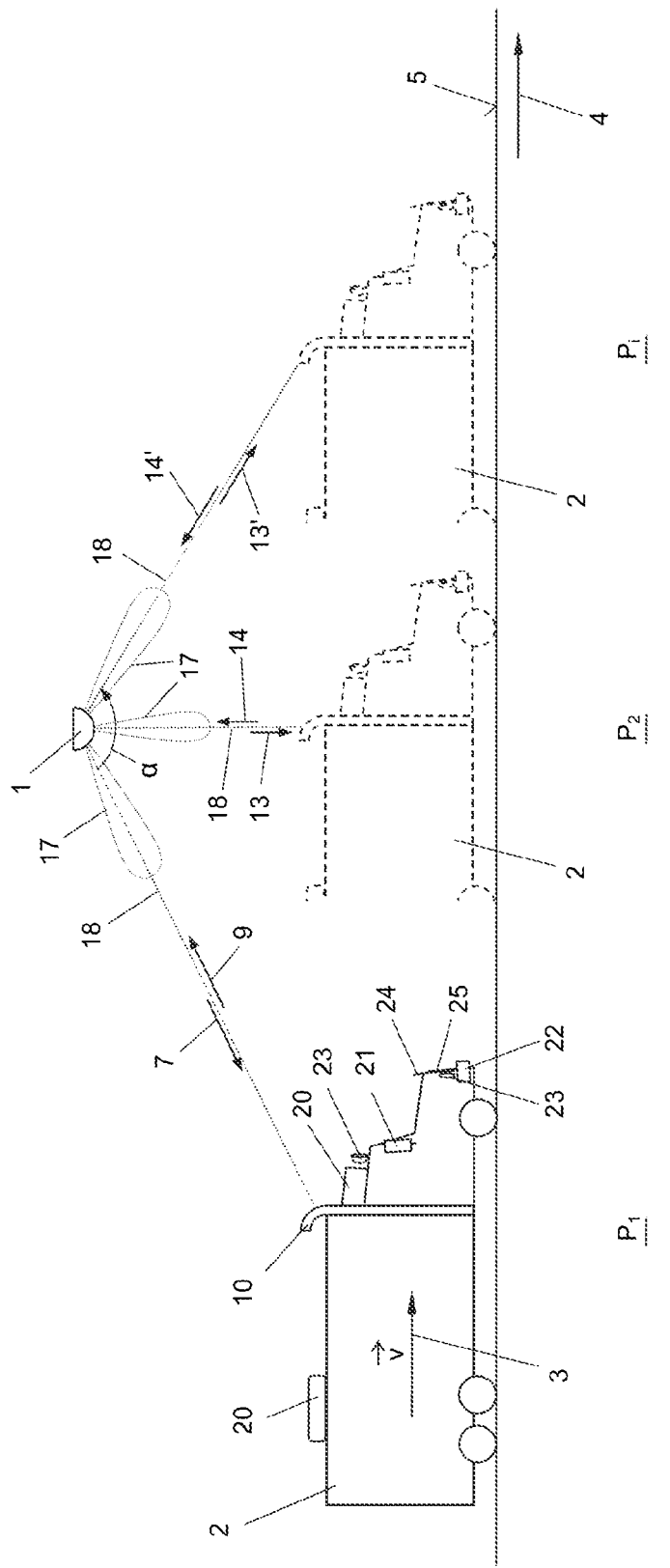
FIG. 1 shows a schematic side view, transverse to the direction of travel of a roadway, of an apparatus according to an embodiment for determining a characteristic feature of a vehicle.
Figure 2:
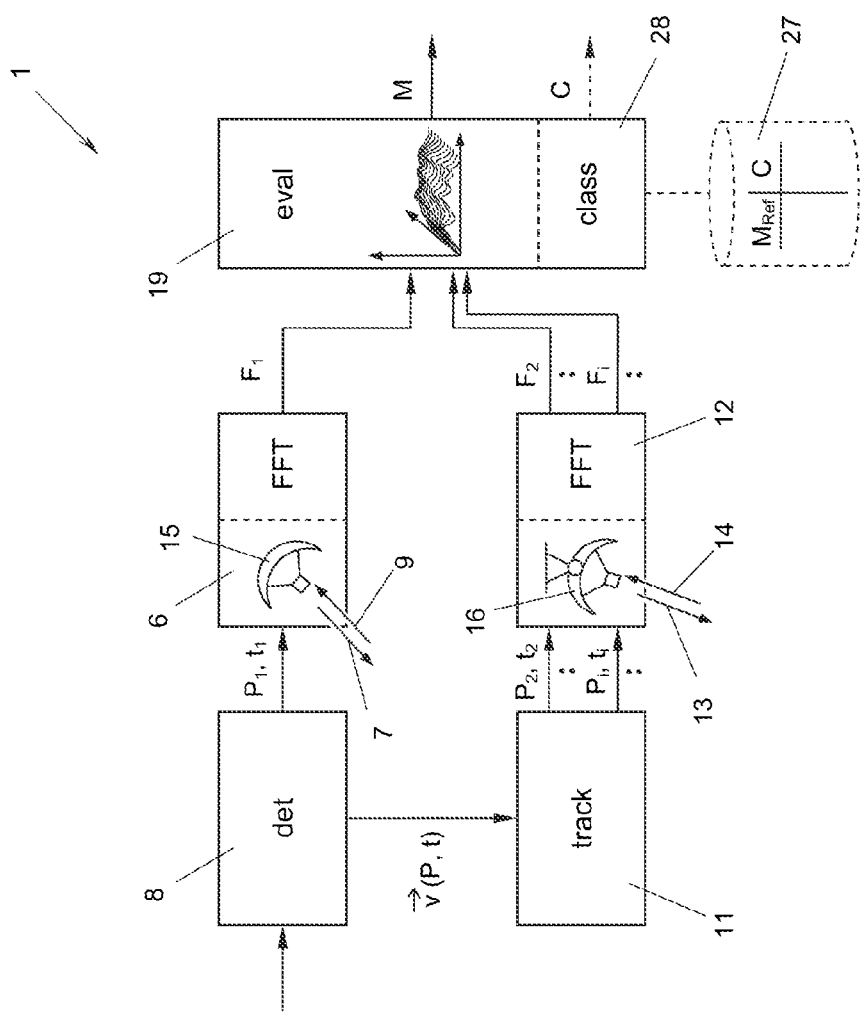
FIG. 2 shows a block diagram of an example of the apparatus according to FIG. 1.

FIGS. 1 and 2 show an apparatus 1 for determining a characteristic feature M of a vehicle 2, which travels at a speed v along a movement vector 3 in the direction of travel 4 of a roadway 5. A first radar sensor 6 of the apparatus 1 transmits a first radar beam 7, which is directed towards a current location $P_1$ at which the vehicle 2 is detected by a detector 8. The first radar beam 7 is reflected at least in part by the vehicle 2. The first radar sensor 6 then receives a first radar beam 9 reflected on the vehicle 2 and determines a first frequency spectrum $F_1$ thereof in a manner known to a person skilled in the art, for example by means of fast Fourier transformation (FFT).

The detector 8 detects not only a vehicle 2 at a current location $P_1$ at a current time $t_1$, but also measures the movement vector 3 of the vehicle 2, more specifically before, simultaneously with, or after the transmission of the first radar beam 7. To this end, the detector 8, for example at a current location $P_1$, may have light barriers (not illustrated) running at a suitable height transversely over the roadway 5 or may be formed as a laser sensor or separate radar sensor. The detector 8 may be directed fixedly towards the current location $P_1$ and may detect the appearance of a vehicle 2 at this location, may measure the current time $t_1$ of the appearance and may ascertain the current location/time pair $P_1$, $t_1$; alternatively, the detector 8 may also be formed for example as a roadway laser scanner and may record the detection location of a vehicle 2 together with the detection moment as a current location/time pair $P_1$, $t_1$.

In the example of FIG. 1, the detector 8 is formed by the first radar sensor 6 itself, which determines the current location/time pair $P_1$, $t_1$ by detecting the current time $t_1$ of part of the vehicle 2 at a predefined current location $P_1$, towards which the first radar sensor 6 is fixedly directed. The vehicle part (here a vertically protruding exhaust part 10) is detected in this example by comparing the frequency spectrum $F_1$ of the first reflected radar beam 7 with a reference frequency spectrum determined with an empty roadway 5.

In order to detect characteristic features M of a vehicle 2, a suitable frequency selection of the radar system is helpful, wherein a broadband radar is very advantageous, for example UWB (ultra wide band) radar. Characteristic features in the form of specific vehicle objects (for example superstructures, body parts, etc.) here provide a reference point for the suitable selection of the frequency range, of which the mechanical dimensions correspond with the wavelength (or multiple thereof) of the radar beam.

The apparatus 1 measures the movement vector 3 according to FIG. 1, for example on the basis of a Doppler evaluation of the first reflected radar beam 9, and more specifically, measures the speed v thereof under the assumption of the direction of travel 4 of the roadway 5 as the direction of movement of the vehicle 2. Alternatively, the apparatus 1 could determine the movement vector 3 in a different way, for example from the measurement of at least two successive vehicle positions and moments in time.

A tracking unit 11 connected to the detector 8 calculates, on the basis of the current location $P_1$, current time $t_1$ and movement vector 3 of the vehicle 2, a target location $P_2$, at which the vehicle 2 should be located at a target time $t_2$ which has likewise been calculated. The apparatus 1 may have range limits for this calculation, within which the target location $P_2$ and/or the associated target time $t_2$ are to be located with this calculation.

A second radar sensor 12, connected to the tracking unit 11, then transmits a second radar beam 13, directed towards the target location $P_2$, at the target time $t_2$, receives a second radar beam 14 reflected by the vehicle 2, and determines a second frequency spectrum $F_2$ thereof. If desired, the tracking unit 11 can calculate further target location/time pairs $P_i$, $t_i$ (i=3, 4, 5, ... ), wherein, for the calculation of each further target location/time pair $P_i$, $t_i$ a further movement vector 3 of the vehicle 2 may optionally be measured in each case in order to increase the accuracy; the second radar sensor 12, as shown in FIG. 1, then also transmits further second radar beams 13' or receives further reflected second radar beams 14' and determines further frequency spectra $F_i$ (i=3, 4, 5, ... ) thereof.

As is known from the art, the radar sensors 6, 12 transmit their radar beams 7, 13, 13' via radar antennas 15, 16 each with a lobe-shaped direction characteristic 17, wherein the central axes of the primary transmitting lobes 17 are considered to be the primary transmitting directions 18 directed towards the current or target locations $P_j$ (j=1, 2, 3, ... ), as shown in FIG. 1. The opening or bundling angle of a transmitting lobe 17 depends on the directivity of the respective antenna 15, 16, which is also defined by what is known as the "antenna gain". The stronger the directivity of the radar antennas 15, 16, the more radar energy lies in the primary transmitting direction 18 and the more pronounced is the emergence of individual vehicle parts, contacted by the transmitted radar beams 7, 13, 13', in the frequency spectra $F_j$ (j=1, 2, 3, ... ). By contrast, the lower the directivity of the transmitting lobe 17, that is to say the lower the antenna gain, the greater is the expected diversity of amplitude peaks occurring in the frequency spectra $F_j$.

A greater beam opening width transverse to the roadway 5 and a smaller beam opening width along the roadway 5 may be advantageous with the selection of the antenna directivity.

To direct the second radar beam 13 to different target locations $P_2$, the direction of the second radar beam 13 of the second radar sensor 12 can be controlled, in particular if further target location/time pairs $P_i$, $t_i$ are to be calculated and for this purpose further frequency spectra $F_i$ are to be determined. To this end, the second radar sensor 12 may have a plurality of sequentially controlled and differently oriented radar antennas 16, or a second radar antenna 16 may be mechanically adjustable.

In an embodiment, the second radar antenna 16 has a controllable direction characteristic, which is formed by a phase-controlled antenna array. Of course, it may also be possible to control the direction of the first radar beam 7 of the first radar sensor 6. Furthermore, if desired, the first and the second radar sensor 6, 12 can be formed by a common radar sensor 12 (not illustrated), of which the direction can be controlled.

With reference again to FIG. 2, an evaluation unit 19 generates the characteristic feature M of the vehicle 2 from the first and the second frequency spectrum $F_1$, $F_2$ and the possible further frequency spectra $F_i$ that is to say from all frequency spectra $F_j$.

Here, frequency spectra $F_j$ of the entire vehicle 2 or parts of the surface structure thereof, for example one or more characteristic attachment parts of the vehicle 2, such as the aforementioned exhaust part 10, a cooling apparatus 20, rear-view mirror 21, bumper 22, headlight 23, wind deflector 24 or radiator grill 25 of the vehicle, can be used here as a characteristic feature M of the vehicle 2. The determined frequency spectra $F_j$ quite generally constitute the characteristic feature M of the vehicle 2 either directly or in further processed form. In principle, the polarisation of the radar beams 7, 9, 13, 13', 14, 14' can also be used, besides the frequency, to determine the characteristic feature M.

Figure 3:
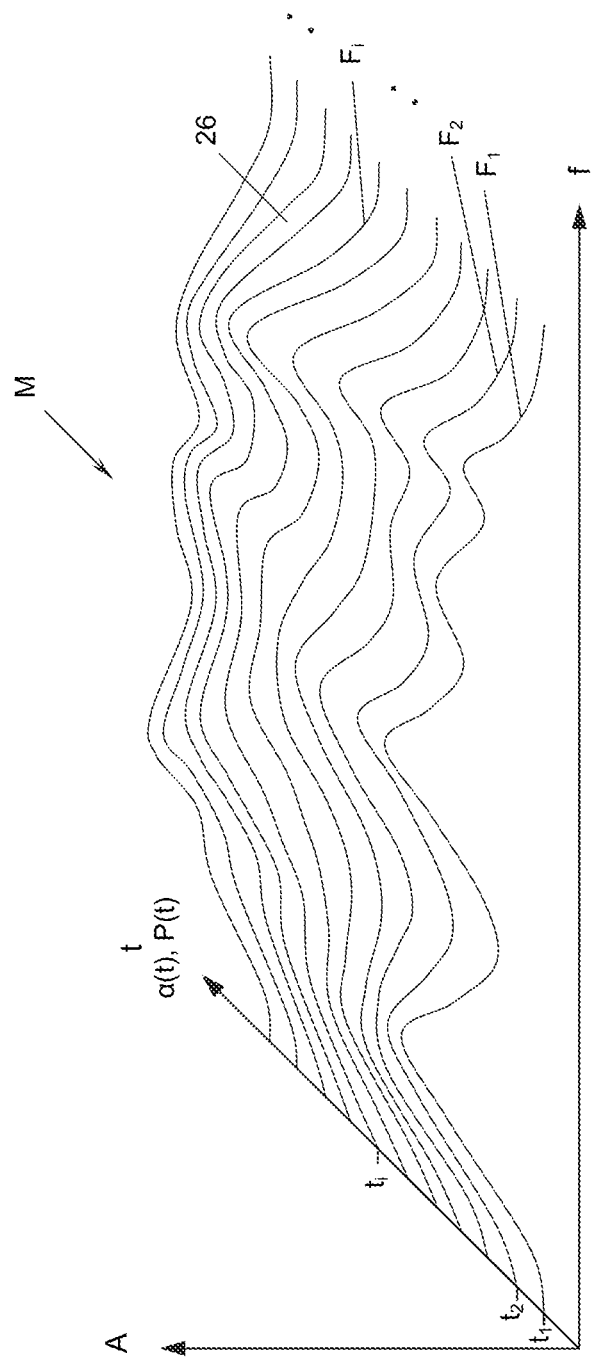
FIG. 3 shows an example for a frequency/time graph of frequency spectra which have been determined with an apparatus according to FIG. 1 or 2.

In the example of FIG. 3, the determined frequency spectra $F_j$ are plotted as a surface 26 over the frequency/time plane f/t. The surface 26 on the whole thus forms the characteristic feature M of the vehicle 2, and therefore, a characteristic "fingerprint" of the vehicle 2 so to speak. It can be seen in the illustration of FIG. 3 that, as a result of the tracking of the vehicle 2 and as a result of the imaging and plotting of a plurality of frequency spectra $F_j$, the characteristic feature M of the vehicle 2 is co-determined by the temporal change of the frequency spectra $F_j$. Different vehicles 2, which have similar frequency spectra $F_j$ in individual perspectives, can still be distinguished on the basis of the temporal profile, and errors when determining the characteristic feature M of a vehicle 2 can be avoided. The temporal profile of the frequency spectra $F_j$ constitutes a spatial radar signature from various aspect angles of a characteristic feature M.

The surface 26 illustrated in FIG. 3 is determined and spanned by the amplitudes A of the frequency spectra $F_j$;

alternatively or in addition, the phases of the frequency spectra $F_j$ can also be taken into consideration and plotted however. As indicated in FIG. 3, the frequency spectra $F_j$ and the surface 26 could also be formed according to an angle of reflection α, measured with respect to the primary transmitting direction 18 of the first radar beam 7, or the current and target locations $P_j$ instead of the time t, for example if significantly variable speeds v of a vehicle 2 would lead to a non-uniform resolution or a distortion of the surface 26.

If desired, frequency spectra $F_j$, for example in the form of surfaces 26, can be stored in an optional database 27 of the apparatus 1 as characteristic reference features $M_{Ref}$ of reference vehicles. If these reference vehicles are assigned to specific vehicle classes C, the evaluation unit 19 can thus compare the generated characteristic feature M of a vehicle 2 with the reference features $M_{Ref}$ from the database 27 in a classification stage 28, and, in the case of a match, can output the vehicle class C of the matching reference vehicle for the vehicle 2, that is to say can classify the vehicle 2.

Figure 4A:
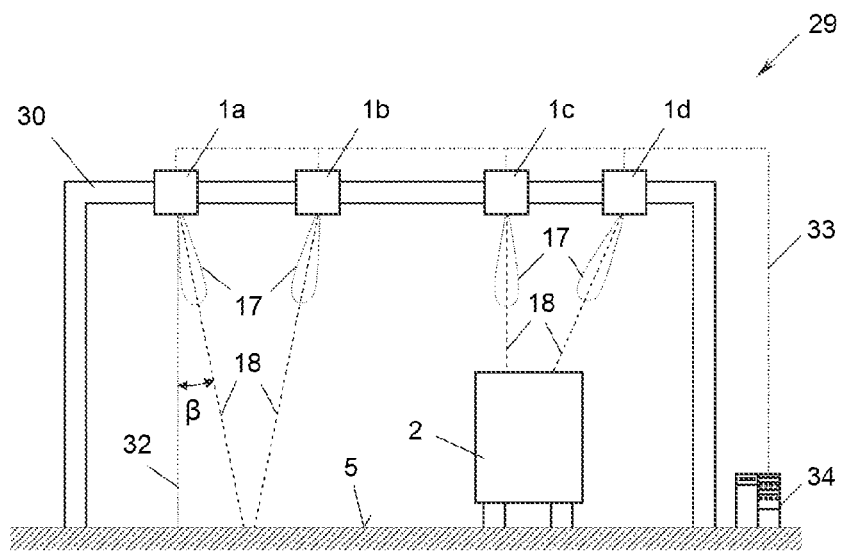
FIGS. 4a and 4b show a system comprising a plurality of apparatuses according to FIG. 1 or 2 in a plan view (FIG. 4a) and a view in the longitudinal direction of the roadway (FIG. 4b).
Figure 4B:
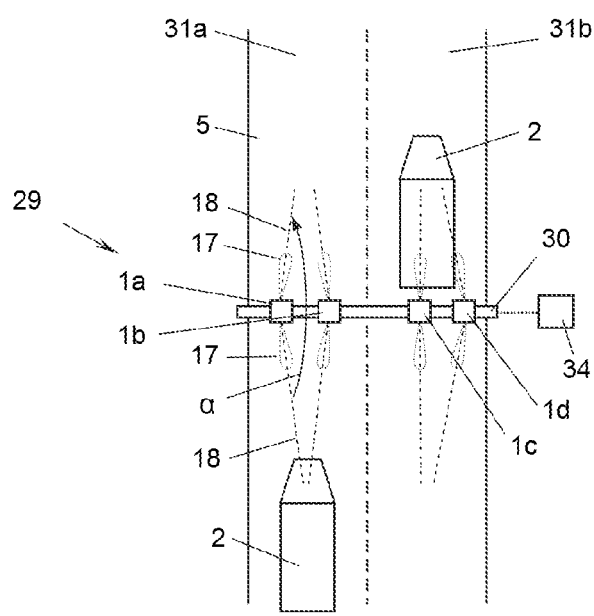

In accordance with the examples in FIGS. 4a and 4b, a plurality of the apparatuses 1—shown as 1a, 1b, 1c, 1d in FIGS. 4a and 4b—can be combined to form a system 29. In this example, the apparatuses 1a, 1b, 1c, 1d are mounted at a distance from one another to a gantry 30 spanning the roadway 5, wherein two apparatuses 1a, 1b are directed towards a traffic lane 31a and the two other apparatuses 1c and 1d are directed towards the adjacent traffic lane 31b.

As shown in FIG. 4a, the primary transmitting directions 18 may have different and, if desired, even variable angles β in a plane transverse to the direction of travel 4 with respect to a normal 32 to the roadway 5. Further, the apparatuses 1a, 1b, 1c, 1d can be interconnected via a data connection 33 and can be connected to a computing unit 34. The computing unit 34 could record the characteristic features M of the vehicles 2 or optional classification results C and/or could forward these to a central unit (not illustrated), for example of a road toll system. Further, individual tasks of the detector 8 of the tracking unit 11 and of the radar sensors 6, 12 and of the evaluation unit 19 can be outsourced to the computing unit 34 if desired, said computing unit in this case also being able to carry out these tasks, for example the tracking or a spectral analysis, centrally for all apparatuses 1a, 1b, 1c, 1d.

Of course, the roadway 5 from FIGS. 4a and 4b may also have more than two lanes and/or the lanes 31a, 31b may have different directions of travel 4. One apparatus or more than two apparatuses 1 may also be used for each lane 31a, 31b and can be arranged, if desired, also to the side of the roadway 5 or before or after a bend, even in line with the roadway 5, provided radar beams 7, 13, 13' can be transmitted towards a passing vehicle 2.

CONCLUSION

The subject matter disclosed herein is not limited to the presented embodiments, but includes all variants, modifications and combinations of the presented measures which fall within the scope of the accompanying claims.

What is claimed is:

1. An apparatus for determining a characteristic feature of a vehicle travelling on a roadway, comprising:
   a detector, which is directed towards the roadway and which is configured to measure a movement vector of the vehicle at a current location at a current time;
   a tracking unit, connected to the detector, for calculating a target location of the vehicle at a target time using the current location, current time and movement vector;
   a first radar sensor, connected to the detector, for transmitting a first radar beam directed towards the current location, receiving a first reflected radar beam and determining a first frequency spectrum of the first reflected radar beam;
   a second radar sensor, connected to the tracking unit, for transmitting a second radar beam, directed towards the target location, at the target time, receiving a second reflected radar beam, and determining a second frequency spectrum of the second reflected radar beam; and
   an evaluation unit for generating the characteristic feature of the vehicle from the determined frequency spectra, wherein the determined frequency spectra constitute the characteristic feature of the vehicle, and wherein the frequency spectra form the characteristic feature as a surface over a frequency/time plane.

2. The apparatus according to claim 1, wherein a direction of the second radar beam of the second radar sensor can be controlled.

3. The apparatus according to claim 2, wherein the second radar sensor has a radar antenna with a controllable direction characteristic in form of a phase-controlled antenna array.

4. The apparatus according to claim 2, wherein the tracking unit is configured to calculate at least one further target location/time pair, wherein the second radar sensor is configured to determine at least one further frequency spectrum, and wherein the evaluation unit is configured to generate the characteristic feature from the determined frequency spectra and the determined at least one further frequency spectrum.

5. The apparatus according to claim 2, wherein the first and second radar sensors are formed by a common radar sensor, of which the direction can be controlled.

6. The apparatus according to claim 1, wherein the detector is formed by the first radar sensor, which measures a speed of the movement vector in a direction of travel of the roadway.

7. The apparatus according to claim 6, wherein the detector uses a Doppler evaluation of the first reflected radar beam for measuring the speed of the movement vector.

8. The apparatus according to claim 1, further comprising:
   a database for receiving characteristic reference features of reference vehicles of known vehicle class, wherein the evaluation unit is further configured to compare the generated characteristic feature with the reference features, and, in response to determining a match, to output the vehicle class of the matching reference vehicle.

9. A system comprising at least two apparatuses according to claim 1, wherein the at least two apparatuses are mounted at a distance from one another on a gantry spanning the roadway.

10. The system of claim 9, wherein at least two of the at least two apparatuses are directed towards different lanes of the roadway.

11. A method for determining a characteristic feature of a vehicle travelling on a roadway, said method comprising:
   transmitting a first radar beam, directed towards a current location, at a current time, receiving a first reflected radar beam and determining a first frequency spectrum of the first reflected radar beam, with simultaneous, prior or subsequent measurement of a movement vector of the vehicle at the current location and calculation of a target location of the vehicle at a target time using the current location, current time and movement vector;

transmitting a second radar beam, directed towards the target location, at the target time, receiving a second reflected radar beam, and determining a second frequency spectrum of the second reflected radar beam; and generating the characteristic feature of the vehicle from the determined frequency spectra, wherein the determined frequency spectra constitute the characteristic feature of the vehicle, and wherein the frequency spectra form the characteristic feature as a surface over a frequency/time plane.

12. The method according to claim 11, wherein at least one further target location/time pair is calculated, and at least one further frequency spectrum is determined, wherein the characteristic feature is generated from the determined frequency spectra and the determined at least one further frequency spectrum.

13. The method according to claim 12, wherein, for the calculation of each further target location/time pair, a further movement vector is measured.

14. The method according to claim 11, wherein a speed of the movement vector in a direction of travel of the roadway is measured using a Doppler evaluation of the first reflected radar beam.

15. The method according to claim 11, wherein the current location/time pair is determined by detecting the current time of a part of the vehicle at a predefined current location, and wherein the vehicle part is detected by comparing the frequency spectrum of the first reflected radar beam with a reference frequency spectrum determined with an empty roadway.

16. The method according to claim 11, further comprising:

classifying the vehicle, wherein the generated characteristic feature is compared with reference features of reference vehicles of known vehicle class, and, in response to determining a match, the vehicle class of the matching reference vehicle is output.

* * * * *